2,758,112

PROCESS FOR THE PREPARATION OF OXIDATION PRODUCTS OF CELLULOSE

Hendrik Waning, Nimeguen, Netherlands, assignor to Naamlooze Vennootschap Kunstzijdespinnerij Nyma, Nimeguen, Netherlands, a limited-liability company of the Netherlands No Drawing. Application September 13, 1952, Serial No. 309,569

Claims priority, application Netherlands September 21, 1951

4 Claims. (Cl. 260—212)

The present invention relates to the oxidation of cellulose wherein only or mainly the primary hydroxyl group is oxidised into a carboxyl group.

When cellulose material, such as cotton linters or wood cellulose is treated with oxidation agents, such as peroxides, hypochlorites, potassium permanganate etc. chemically and physically inhomogeneous products are usually formed. The usefulness of these products is limited, not only owing to the loss of strength and sometimes even of the fibre structure, but also owing to the chemical properties.

It is known that nitrogen dioxide (nitrogen tetroxide) is a selective oxidation agent for cellulose material (Yackel and Kenyon: J. Am. Chem. Soc. 64 (1942) 121).

This oxidising agent acts on carbon atom 6 of the glucose radical of the cellulose molecule at which the primary hydroxyl group is present in such a way that a carboxyl group is formed.

One can easily obtain oxidation degrees at choice up to a maximum of one carboxyl group per glucose radical.

Oxidation products of cellulose material thus obtained are valuable on account of the retention of the fibre structure and on account of the attractive properties which are due to the presence of carboxyl groups. To those properties belong also the solubility in body liquids (such as blood, whereby the application as absorbable dressing in surgical operations is possible), the solubility in diluted alkaline solutions, the formation of salts, ion exchange capacity, etc.

This oxidation method has, however, the drawbacks that one must handle the volatile and very toxic nitrogen dioxide (nitrogen tetroxide) and that the losses of nitrogen dioxide occurring during the oxidation are of such a nature that the product obtained is rather expensive.

Furthermore this reaction required a complicated apparatus which apparatus must moreover be highly resistant against corrosion and is, consequently, very expensive.

It is furthermore known that analogous oxidation products of cellulose material are obtained if one uses as oxidising agent nitrite containing approximately 70% nitric acid. (Pigman et al.: J. Am. Chem. Soc. 71 (1949) 2200).

With this oxidation method the drawbacks inherent in the use of nitrogen dioxide (nitrogen tetroxide) as oxidising agent are removed but the oxidation rate is very low.

For the preparation of an oxidation product which is soluble in 1% aqueous sodium hydroxide solution, at least 72 hours are necessary for the oxidation.

According to the invention oxidation products of cellulose, which products contain carboxyl groups, are prepared by oxidising the cellulose with nitric acid containing nitrous acid to which sulphuric acid has been added.

According to the invention the cellulose material is preferably treated with a mixture of 50–70% nitric acid and concentrated sulphuric acid in the presence of nitrites, nitrous acid and/or nitrogen monoxide.

The concentration of the nitric acid is insofar important for the course of the reaction that in case of higher $HNO_3$-concentration there is a chance of nitration, whereas in case of lower concentration the reaction rate becomes lower. A favourable $HNO_3$-concentration is for example 65%.

In the above mentioned mixture of nitric acid-sulphuric acid preferably not more than 25% by volume of sulphuric acid is present. In case of low sulphuric acid—concentrations (e. g. 3–5%) the oxidation rate is lower than in case of higher concentrations.

In the presence of these higher concentrations, on the contrary, more hydrolysis of the cellulose occurs. A very favourable concentration of sulphuric acid with which, therefore, very little hydrolysis occurs and the reaction rate is sufficiently high, is 10% by volume of the $HNO_3$—$H_2SO_4$ mixture.

With the above mentioned oxidising agent a product which is soluble in 1% aqueous sodium hydroxide solution is obtained in at most 24 hours, in many cases in less than 16 hours. The great advantage of this process is, therefore, the much shorter duration of the oxidation compared with that in the case of nitric acid containing nitrite as oxidising agent. Another advantage is that the mixture of nitric acid—sulphuric acid is cheaper than nitric acid alone.

The oxidative treatment with the mixture of nitric acid-sulphuric acid may be carried out by impregnation of the cellulose material during the time necessary for obtaining the desired carboxyl content and at a suitable temperature, whereupon the greatest amount of acid is removed from the oxidation product by filtration, centrifugal action and/or pressing, the product is washed with water until it is free of acid and dried.

The drying should preferably be carried out at a moderate temperature, e. g. at 50–60° C.

Also after a short time, e. g. 1 hour, of impregnating the greatest amount of acid can be removed from the cellulose material and thereupon the mass can be stored under equal conditions of temperature and time in a closed vessel and the material can be washed with water and dried after the desired degree of oxidation.

Also in order to avoid impregnating and pressing of the cellulose material the amount of oxidising agent necessary for the oxidation can be finely divided over the cellulose material by spraying or kneading.

Since the oxidation rate is also dependent on the ratio of oxidising agent to cellulose material one must take at least 2 parts by weight of oxidising agent per 1 part by weight of cellulose material to obtain an oxidation rate which does not lie much below the above mentioned one.

The temperature at which the oxidative treatment of the cellulose material takes place may suitably amount to room temperature of at most 40° C., preferably 30 to 35° C. The nitrogen content of the oxidation products obtained according to the invention is less than 0.5%, as a rule less than 0.2%, so that nearly no nitration takes place. Nitration of the cellulose material tends to preponderate if the nitric acid has a concentration above 70%, whereas the hydrolysis tends to preponderate when the concentration of the nitric acid is taken less than 50%.

The oxidation products with a high oxidation degree—the products which contain 12% by weight or more of carboxyl groups—are soluble in diluted alkaline liquids such as 1% sodium hydroxide solution, 1% ammonia or 1% soda solution. The alkali metal salts are soluble in water, the salts of polyvalent metals are not. Said oxidation products are moreover souble in body liquids, such as blood, whereby application as absorbable dressing for surgical purposes is possible.

Oxidation products with a lower oxidation degree may excellently serve as dressing material owing to their swelling capacity with water and body liquids.

Moreover the oxidation products posses a great ion exchanging capacity. Furthermore they can be used as dispersing agents and they are capable in the form of a salt, e. g. sodium salt—analogous to carboxy methyl cellulose—to increase the dirt carrying capacity of fatty acid soaps and synthetic washing agents.

Owing to the great affinity of basic dye-stuffs for these oxidation products one can obtain particular dyeing with very low oxidation degrees.

One understands by cellulose material all material mainly consisting of cellulose, such as cotton linters cellulose, fur cellulose, regenerated cellulose, textile of cotton, linen or regenerated celluose, paper, etc.

Cotton may aso be oxidised according to the invention in the form of threads or fabrics, but also as fibres, in which latter case the fibres may be extruded in the usual way and further worked up.

Finally the invention is elucidated by some examples.

(1) 1 part by weight of air dry wood cellulose is impregnated at 30° C. during 16 hours in 20 parts by weight of a mixture consisting of 90 parts by volume of 65% nitric acid, 10 parts by volume of 96% sulphuric acid and 1 part by weight of sodium nitrite.

Thereupon the oxidation product is filtered, washed with water until it is free of acid and dried. The product has a carboxyl content of approximately 16% and is easily completely dissolved in a 1% aqueous sodium hydroxide solution. When omitting the sulphuric acid in the above mentioned oxidation mixture, one directly obtains a carboxyl content of 10% and the product does not completely dissolve in 1% NaOH. In order to obtain under these circumstances also without $H_2SO_4$ a carboxyl content of 16% the reaction period must be prolonged to approximately 40 hours.

(2) 1 part by weight of air dry wood cellulose is mixed in a measuring and kneading machine with 2.5 parts by weight of the acid mixture mentioned in example 1. After ½ to ¾ hour of grinding the mass is allowed to stand in a closed vessel at 30° C. for 24 hours. Thereupon the oxidation product is washed and dried. The carboxyl content appears to be 12.9% and the product is easily dissolved in 1% aqueous sodium hydroxide solution.

(3) 1 part by weight of bleached cotton fibres is treated according to Example 1. The product obtained after drying can be carded, spun and worked up in the usual way.

What is claimed is:

1. Process for the preparation of oxidation products of cellulose which contain carboxyl groups and which are completely soluble in 1% NaOH, comprising the step of reacting cellulose with a mixture of nitric acid having a concentration of 55 to 70%, 5–20% by volume of concentrated sulfur acid, and 1% by weight of a substance selected from the group consisting of sodium nitrite, nitrogen monoxide and nitrous acid.

2. Process for the preparation of oxidation products of cellulose which contain carboxyl groups and are entirely soluble in 1% NaOH, comprising the step of reacting cellulose with a mixture of nitric acid having a concentration of 60–65%, 5–10% by volume of concentrated sulfuric acid, and 1% by weight of a substance selected from the group consisting of sodium nitrite, nitrogen monoxide and nitrous acid.

3. Process for the preparation of oxidation products of cellulose which contain carboxyl groups and are completely soluble in 1% NaOH, comprising the step of reacting cellulose with a mixture of 80–95% by volume of nitric acid having a concentration of 55–70%, 5–20% by volume of concentrated sulfuric acid, and 1% by weight of sodium nitrite.

4. An oxidation mixture for cellulose, comprising essentially 80–95% by volume of nitric acid having a concentration of 55–70%, 5–20% by volume of concentrated sulfuric acid, and 1% by weight of a substance selected from the group consisting of sodium nitrite, nitrogen monoxide and nitrous acid.

References Cited in the file of this patent

UNITED STATES PATENTS 2,604,471    Kridel et al. _____ July 22, 1952

OTHER REFERENCES

Pigman et al.: J. Am. Chem. Soc., 71, pages 2200–4 (1949).